United States Patent [19]

Daghe

[11] Patent Number: 4,813,281

[45] Date of Patent: Mar. 21, 1989

[54] UNDERGROUND METER BOX

[75] Inventor: Joseph L. Daghe, Decatur, Ill.

[73] Assignee: Mueller Co., Decatur, Ill.

[21] Appl. No.: 75,464

[22] Filed: Jul. 20, 1987

[51] Int. Cl.⁴ ............................................. G01F 15/14
[52] U.S. Cl. ........................................ 73/201; 73/273;
138/155; 285/404; 285/423
[58] Field of Search .................. 73/273, 201; 138/155;
285/404, 417, 30, 399, 423; 403/300, 305, 306

[56] References Cited

U.S. PATENT DOCUMENTS

| | | | |
|---|---|---|---|
| 217,059 | 7/1879 | Case | 285/404 |
| 627,911 | 6/1899 | Estill | 73/201 |
| 654,615 | 7/1900 | Estill | 285/30 |
| 670,335 | 3/1901 | Winton | 73/201 |
| 701,675 | 6/1902 | Brown | 73/273 |
| 721,295 | 2/1903 | Garretson | 73/201 |
| 983,311 | 2/1911 | Phillips | 73/201 |
| 2,470,359 | 5/1949 | Mc Lean | 285/423 |
| 3,913,400 | 10/1975 | Floren | 73/431 |
| 4,119,334 | 10/1978 | Steed | 285/423 |
| 4,305,282 | 12/1981 | Hunt | 73/201 |

Primary Examiner—Joseph A. Orsino
Assistant Examiner—Kenneth Tso
Attorney, Agent, or Firm—Cushman, Darby & Cushman

[57] ABSTRACT

A below ground meter box for a fluid meter includes a first sleeve for placement at the bottom of a pit in which the fluid meter is located, the first sleeve having apertures for receiving fluid conduits for the fluid meter and a second sleeve of greater axial length than the first sleeve but of substantially the same diameter; the upper edge of the first sleeve has internally an abutment edge spaced a small distance therefrom and externally a curved wall section extending above the upper edge so that when the second sleeve engages the upper edge of the first sleeve, the curved wall section will prevent lateral movement between the sleeves.

3 Claims, 2 Drawing Sheets

UNDERGROUND METER BOX

BACKGROUND OF THE INVENTION

This invention relates to apparatus for lining a meter pit connecting underground pipe. More particularly, this invention relates to an interconnecting two part box: A short lower section which connects to the underground pipe; and a connecting upper section of the same diameter but with varying length.

One obvious advantage of a meter pit is that the meter is outside the house. A meter reader therefore does not have to enter the home nor does the homeowner have to fill out a monthly card with his reading. In cold climates, certain pipes must be buried deep below the surface so that they will not become obstructed, frozen and ruptured (eg. water lines).

However, several problems arise with deep buried lines which the present invention intends to overcome. First, a large hole must be dug for deep boxes. Second, access to each side of the box must be dug so the workmen can climb down to connect the box to the pipe line. Third, the shape of the box cannot easily be altered once installed. Fourth, if the pipe line is connected prior to lowering the box, it imposes unusual strains on the connection or the box and is not practical with rigid piping.

Additional problems arise with the manufacture of only one length such as a relatively tall meter box. Various sizes must be made and stocked to anticipate future orders. The boxes tend to be long and bulky, making shipping and handling expensive and difficult.

The prior art discloses meter boxes which consist of only one long member. In Hunt, U.S. Pat. No. 4,305,282, a tubular liner having a length sufficient to extend from the surface to the level of said pipe is disclosed.

The present invention intends to provide an improved, enconomical meter box which allows easy shipping, handling, and two-part installation.

SUMMARY OF THE INVENTION

The present invention provides an improved underground meter box which eliminates the problems previously discussed, by simply creating a box consisting of two interconnectable sections. A lower section of uniform height and diameter, to which pipe couplings are attached, rests at the bottom of the pit. Prior to this invention, workmen had to dig a hole much larger in diameter compared to that of the meter box. This is because the workmen would have to climb down into the pit, along side the meter box, and connect the box couplings to the existing underground pipe. With the help of this invention a pit of narrower cross section may now be dug. A workman will be able to stand within this lower section and attach the pipe line to the couplings. A second upper section of selected height and style may then be attached to the top of the lower section. The height will be such that together with the lower section the entire unit will extend from the underground pipes to the surface. A sleeve which is connected to the top half of the lower section may be used to connect the two sections. Since the pipe line may be coupled to the box while one half of the box is in the pit, no unusual strain is placed on any of the pipes or meter connections.

The present invention also has advantages for the manufacturer and distributor. Several uniform lower sections may be manufactured and stocked while the variable upper section may be matched per order. Prior meter boxes, if they were tall, were usually shipped laying on their side. In this position, the prior meter boxes ran the risk that the protruding pipe line couplings would be damaged. With the present invention, shipping is now simpler since the bottom section, to which the couplings are attached, can be better protected. The longer top section may be laid on its side. Handling is easier since the longer, bulkier upper section is lightweight while the lower section is intentionally made easy to handle.

The present invention is designed to accommodate meters set at a fixed height above the underground pipe or meters which may be raised or lowered from the surface.

BRIEF DESCRIPTION OF THE DRAWINGS

These and other advantages of the present inventions are exemplified through study of the drawings together with the detailed description of the presently preferred exemplary embodiment. Parts with the same number in different figures refer to the same part throughout the views.

DETAILED DESCRIPTION OF THE PRESENTLY PREFERRED EXEMPLARY EMBODIMENT

Figure 3:
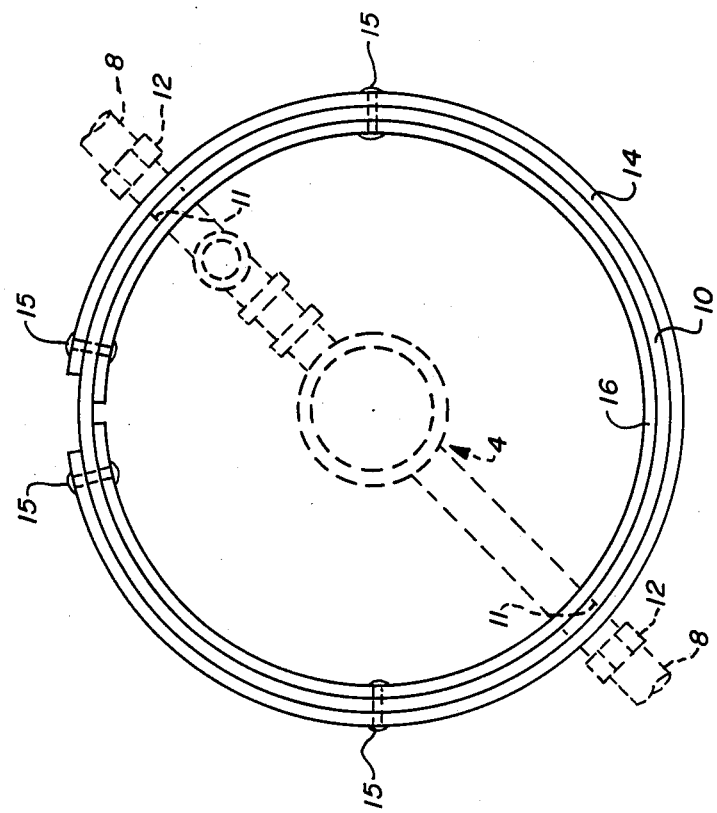
FIG. 3 is a top view of the embodiment depicted in FIG. 2.
Figure 1:
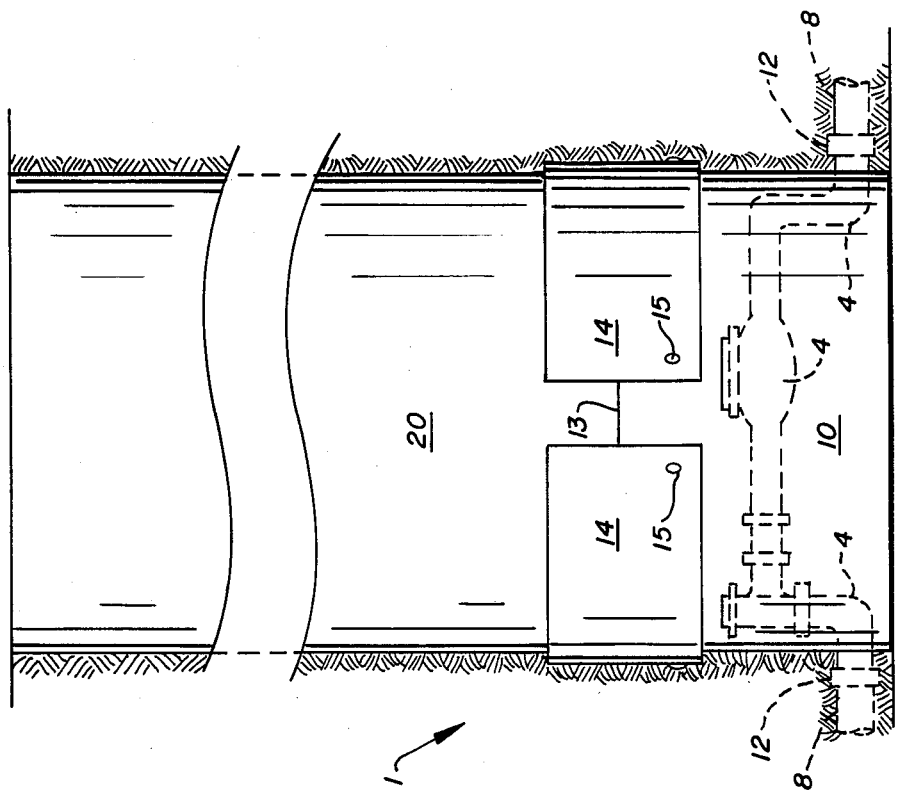
FIG. 1 is a side view of the upper and lower sections in accordance with the invention.
Figure 2:
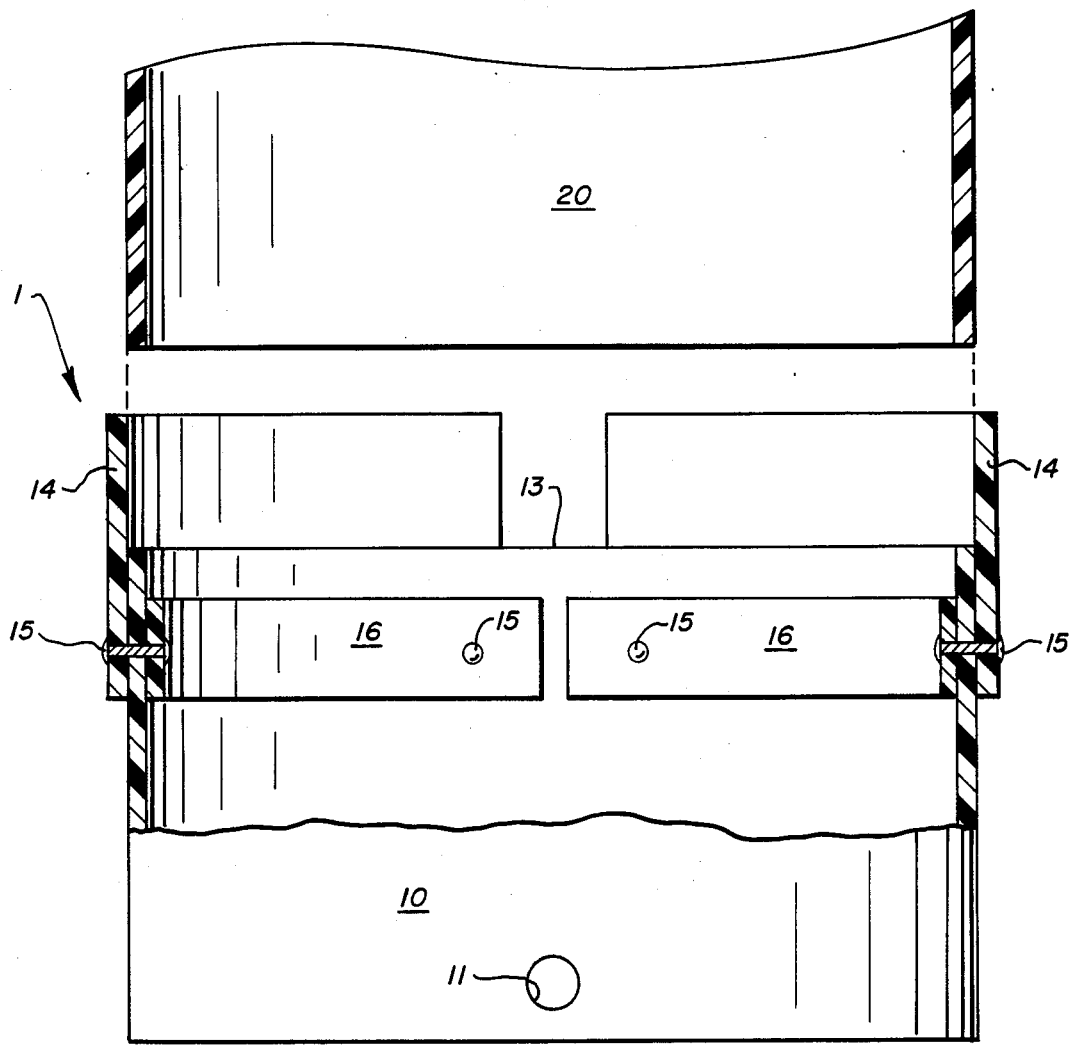
FIG. 2 is a fragmentary sectional view of the lower section in accordance with the invention.

Referring to FIGS. 1, 2, and 3, the apparatus according to the present invention provides a liner 1 for a pit so that a device 4 can be connected to an underground pipe 8. The pit liner, also known as a "meter" box, has two interlocking pieces: lower section 10 placed in the bottom of the pit, and upper section 20 interconnected on top of the lower section. Those ordinarily skilled in the art will understand that the meter box cross section may vary in accordance with the cross section of the pit.

The lower section 10 has a preselected axial length and diameter. Two apertures, 11, are placed 180 degrees apart. Attached to apertures 11 are two couplings, 12, which attach to underground pipe 8. Couplings 12 connect to a device such as meter 4 inside the liner 1.

Upper section 20 has the same diameter as section 10 but varies in axial length to accommodate differing pit depths. The pit is dug to a depth which is sufficient to prevent low atmospheric temperatures in a given geographic area from adversely affecting the operation of device 4. Thus, the axial length of upper section 20 is preselected to match this sufficient pit depth and is usually longer than section 10. Both upper and lower sections may be made of PVC cylinders.

Attached to the top of the lower section 10 is coupling means 14. FIG. 2 shows a curved wall section 14, one half of which rises above top 13 of lower section 10. Another wall section 16, inside of lower section 10, helps strengthen the coupling. Wall sections 14 and band 16 are affixed to the top of lower portion 10 by means of rivets 15 or other suitable fastening member. Upper section 20 then simply slides into wall section 14 and rests upon top edge 13. Thus, lateral movement of the two sections is inhibited.

In operation, the lower, shorter and more easily manipulated portion 10 may be placed in the pit and coupled to the underground pipe 8. A workman in the pit would have a greater degree of mobility when installing the meter since he would not have to work within the entire meter box, which according to the prior art would extend above him. The upper section 20 may afterwards be placed in sleeve 14, resting upon edge 13.

While the invention has been described in connection with what is presently the preferred embodiments, the invention is not limited to the disclosed embodiment, but, is intended to cover various modifications and equivalent arrangements included within the spirit and scope of the following claims. For example, the number of couplings 12 may vary with the number of underground pipes intersecting the meter box. Additionally, the coupling means could be latches attached to the bottom of the upper section 20. The two sections need not be round. Moreover, in such a structure the apparatus still has a uniform lower section which connects to a variable length upper section. Thus, persons of ordinary skill in this field are to understand that all such equivalent structures are to be included within the scope of the following claims.

I claim:

1. An underground meter box installation apparatus of the type installed in a pit formed in the ground at a depth sufficient to prevent low atmospheric temperatures from adversely effecting the operation of a fluid meter, said apparatus comprising:

a first sleeve means having aperture means for receiving segments of conduit means for connection to a fluid meter, said first sleeve means having a preselected axial length, a preselected diameter, and a top end which, when said first sleeve means is installed in the base of the pit, will face upwardly toward the top of the pit;

a second sleeve means having a preselected axial length that is greater than the preselected axial length of said first sleeve means, a circumference equal to the circumference of said first sleeve means, and a bottom edge in which, after placement of said first sleeve means in the pit, said second sleeve means can be slidingly inserted into the pit with said bottom edge of said second sleeve means disposed on said top edge of said first sleeve means;

a narrow band having a circumference slightly less than the first sleeve means that is disposed within and connected to said first sleeve means slightly below said top edge; and a curved wall section having a circumference slightly greater than said first sleeve means with one end disposed outside of and connected to said top end of said first sleeve means and another end extending substantially above said top edge of said first sleeve means to prevent lateral movement of one sleeve means with respect to the other sleeve means when said second sleeve means is inserted into the pit to engage said first sleeve means.

2. The apparatus of claim 1 wherein said first and second sleeve means are made of polyvinyl chloride.

3. The apparatus of claim 1 wherein said curved wall section and said narrow band are attached to the first sleeve means with rivets.

* * * * *